June 22, 1971 — J. A. SCHROEDER — 3,585,704
CLAMPING DEVICE
Filed May 19, 1969 — 2 Sheets-Sheet 1
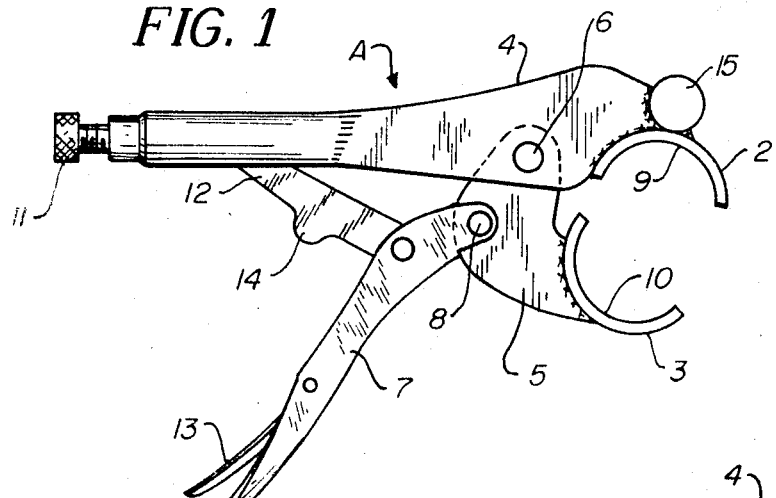
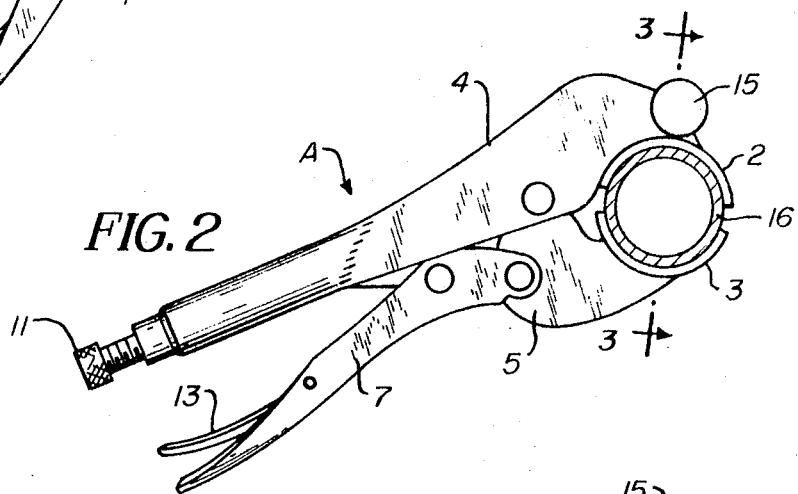
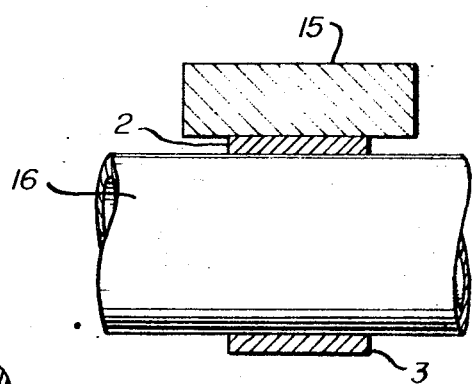
FIG. 3
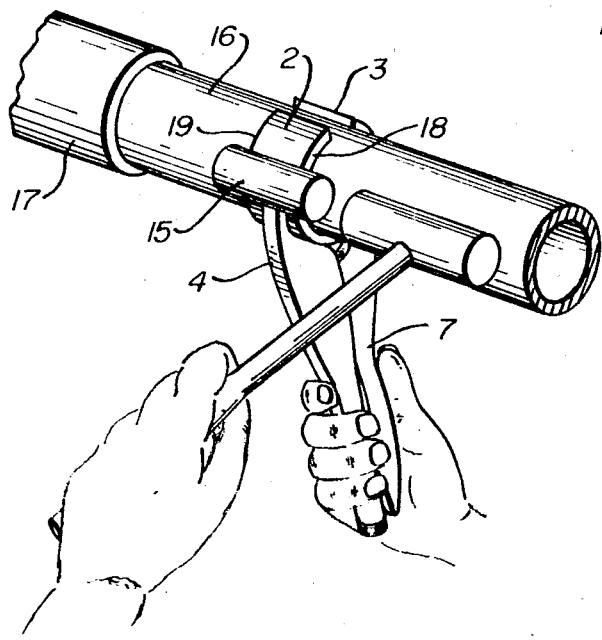
FIG. 4
INVENTOR.
John A. Schroder
BY Richard S. Harrer
Atty.

June 22, 1971  J. A. SCHROEDER  3,585,704
CLAMPING DEVICE

Filed May 19, 1969  2 Sheets-Sheet 2

INVENTOR
John A. Schroeder
BY Richard G. Harrer
Atty.

United States Patent Office 3,585,704
Patented June 22, 1971

3,585,704
CLAMPING DEVICE
John A. Schroeder, 7124 W. Center St.,
Milwaukee, Wis. 53210
Filed May 19, 1969, Ser. No. 825,730
Int. Cl. B25b 27/02
U.S. Cl. 29—275     3 Claims

ABSTRACT OF THE DISCLOSURE

A tool of the pliers or wrench type which is provided with a pair of opposed semi-circular jaws and a striking head mounted adjacent to the jaws for receiving blows delivered by a hammer or mallet to cause a tail pipe gripped by the jaws to be inserted into a muffler.

---

This invention pertains to clamping devices of the type which have a pair of opposed movable jaws which co-operate with each other in gripping an object. More particularly, the invention is concerned with a wrench or pliers which is provided with a pair of semi-circular shaped gripping jaws and further provided with a striking head.

The tool of this invention is particularly adapted to aid in the installation of exhaust systems of automobiles, trucks, and other vehicles although other uses will become apparent. The exhaust system of such vehicles usually consist of an exhaust pipe, muffler and tail pipe. The exhaust pipe is connected to the engine manifold; the muffler is connected to the exhaust pipe and the tail pipe is connected to the muffler. In installing any one or more of the foregoing components of the exhaust system it is important that the connection between the components be tight so as to prevent leakage of exhaust gas. Therefore, when replacing the tail pipe, for example, it is necessary that the new tail pipe be inserted into the appropriate end of the muffler to a sufficient degree so as to prevent leakage of the exhaust gas. The tail pipe on an automobile will unusally be from about 4 to 12 feet in length. It is very difficult for the mechanic to insert the tail pipe into the muffler to a proper degree. Most mechanics grip the tail pipe with their hands and attempt to force it into the muffler. Often times the mechanic is unable to exert sufficient force with his hands to insert the tail pipe into the muffler far enough so as to provide for a leak-proof seal. Because of the length of the tail pipe and the fact that it is usually curved in several directions, it is not possible for the operator to apply hammer blows at the outlet end of the pipe in order to drive it securely into the muffler.

A primary object of my invention is the provision of a tool of the pliers or wrench type having a pair of semi-circular jaws which cooperate with each other in gripping an object, such as a tail pipe, and which tool is also provided with a striking head so that the operator after gripping the tail pipe with the tool is able to use a hammer or mallet to deliver blows to the striking head causing the tail pipe to be inserted into the muffler to the proper extent.

A further object of this invention is the provision of a tool as specified above and in which the gripping semi-circular jaws are of such design as to accommodate objects of widely varying diameter.

It is a still further object to provide a tool having a pair of semi-circular jaws which are easily replaceable.

In the accompanying drawings and in this specification I have shown and described a tool which embodies the invention, however, it will be readily apparent that this invention may likewise be used with other wrenches or pliers and is not deemed to be limited solely to use with the wrench or pliers as described. It will also be apparent that this tool has other uses than those previously described, such as for driving stakes or rods into the ground, particularly where it is not possible to apply blows with a hammer at the end of the stake or rod.

Other objects and advantages of my invention will become apparent during the course of the following detailed description, taken in connection with accompanying drawings, and in which drawings:

FIG. 1 is a side view of a preferred embodiment of my improved tool showing the jaws in an open position.

FIG. 2 is a side view of my improved tool showing the semi-circular jaws gripping a cylindrical pipe.

FIG. 3 is a sectional view taken substantially on the line 3—3 of FIG. 2.

FIG. 4 is a perspective view showing the tool in use and wherein the operator is holding the tool in a clamped position and applying blows to the striking head by means of a hammer.

Figure 5:
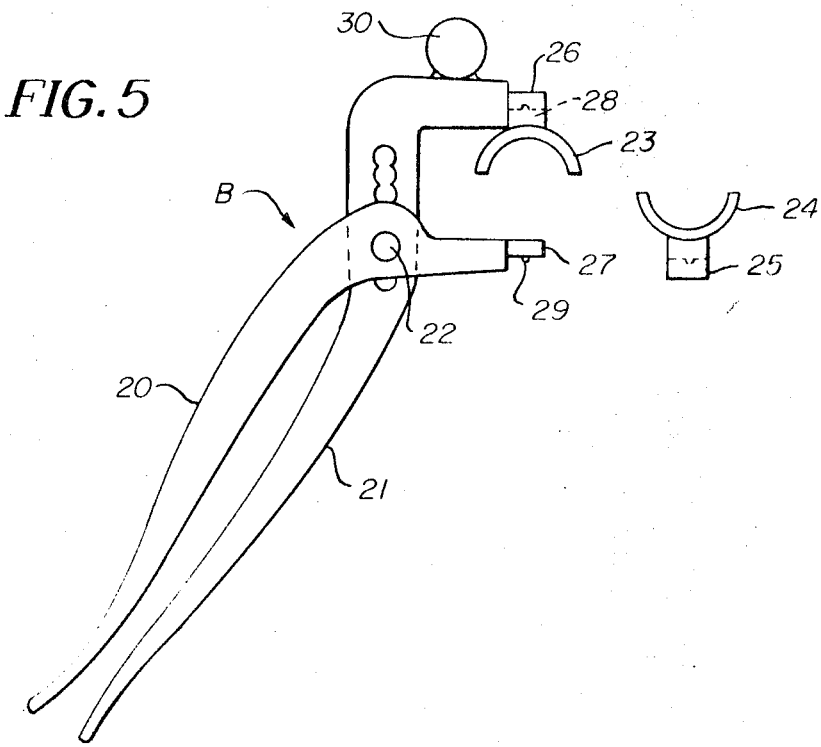
FIG. 5 is another embodiment of my improved tool wherein the semi-circular clamping or gripping jaws are removable and replaceable.

In the drawings the letter A designates generally a pliers embodying my invention. As shown in FIGS. 1 and 2 pliers A incorporates a toggle actuating mechanism as is well known in the art and disclosed in U.S. Pat. 1,489,458. Tool A includes a pair of semi-circular jaws 2 and 3. Jaw 2 is rigidly connected to handle member 4. Lower jaw 3 is rigidly connected to movable jaw supporting member 5 which in turn is hingedly connected to handle 4 by means of a pin 6. Handle member 7 is hingedly connected to jaw-supporting member 5 by means of pin 8. Jaws 2 and 3 are so positioned with respect to each other that upon the bringing together of handles 4 and 7, the respective working faces 9 and 10 of jaws 2 and 3 will be moved toward one another for gripping an object therebetween. Handle 4 may be provided with a threaded screw 11 which abuts against and cooperates with one end of lever 12 in regulating the spaced apart gripping relationship between jaws 2 and 3. A pivoted lever member 13 may be provided on handle 7 for abutment with protuberance 14 of lever 12 in assisting the opening or separation of jaws 2 and 3. It will be appreciated that after the toggle mechanism has been closed and locked easy and efficient release or opening can be achieved by moving the lower end of lever 13 toward lower handle member 7. A solid steel striking head 15 is rigidly secured to the forward end of handle member 4. In actual use of the tool, blows from a hammer are applied to head 15.

In FIG. 2 the pliers are shown in a closed position and wherein the jaws 2 and 3 securely grip a cylindrical pipe 16. The opposed working faces of jaws 2 and 3 are preferably smooth as shown in FIG. 1. In addition, each of the semi-circular jaws should form an arc which is from 90 to 180°; and preferably from about 110–130°. I have found that when each of the semi-circular jaws form an arc of less than 180° the tool is more readily able to securely grip cylindrical objects of widely varying diameter. It is also advantageous that the jaws 2 and 3 be of generous width, preferably from about two to three inches so as to avoid "rocking" of the tool during use. As shown most clearly in FIG. 3, the ends of the striking head 15 extend beyond the sides of the jaws, preferably about one-half inch.

As is shown in FIGS. 1 through 4 the striking head 15 is rigidily mounted at one end of handle member 4 and adjacent jaw 2. As further shown in these drawings the striking head 15 is a solid cylindrical member and in its most preferred version extends a distance beyond the sides 18 and 19 of jaw 2. As shown most clearly in FIG. 4 the operator grips the pipe 16 or other object with the tool and then applies force to the striking head 15 by means of a hammer, mallet or other suitable means to drive the pipe into receptacle 17.

The pliers shown in FIGS. 1 through 4 which includes a toggle actuating mechanism is preferred since once the operator has closed the jaws 2 and 3 about the pipe 16 he need no longer exert pressure on the handle members 4 and 7 in order to keep pressure on the cylindrical pipe. However, other wrenches or pliers may be used instead of such a toggle mechanism as will be shown in FIG. 5.

Figure 6:
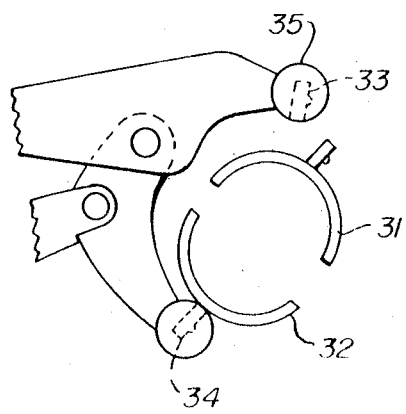
FIG. 6 is a still further embodiment of my tool having removable gripping jaws.

As shown in FIG. 5 the semi-circular jaws 23 and 24 are releasably mounted to handle members 20 and 21 of plier B. The handle members 20 and 21 are pivotally connected to each other by means of a slip joint 22. Rigidly secured to each of jaws 23 and 24 are connector members 25 and 26. Members 25 and 26 are hollowed out so that they will slip over or accommodate the insertion of members 27 and 28 which are elongations of handle members 20 and 21. Each of members 27 and 28 are provided with a spring-loaded steel ball 29 which serves to securely hold the jaw members in position on the handles. In addition, handle member 21 is provided with a striking head 30. The tool as shown in FIGS. 5 and 6 is so designed as to permit the mechanic to readily remove the jaws and to insert jaws of either smaller or larger size depending on the particular need. Thus the tool of my invention is able to grip articles of widely varying diameter.

In FIG. 6 a further variation of a tool having removable jaws is shown, this time utilizing a plier-type toggle wrench such as shown in FIGS. 1–4. The jaws 31 and 32 are inserted into appropriate sockets 33 and 34. In the embodiment shown in FIG. 6 the striking head 35 also serves as a receptacle for jaw 31.

Various changes in the shape, size and arrangement of parts may be made to the form of the invention shown and described without departing from the spirit of the invention or the scope of the following claims.

I claim:
1. A tool of the pliers type and having a pair of pivotally connected handle members, a pair of opposed semi-circular shaped jaws rigidly attached to one end of said handle members, each of said jaws forming an arc of less than 180° and greater than 90°, and a striking head rigidly secured to one of said handle members and adjacent to said jaws, said striking head having a striking surface disposed in a plane perpendicular to the axis of the jaws.

2. The tool of claim 1 wherein each of said jaws form an arc of from about 110° to about 130°.

3. The tool of claim 1 wherein said jaws are releasably mounted to said handle members.

References Cited

UNITED STATES PATENTS

| 2,637,236 | 5/1953 | Vergnani et al. | 81—368X |
| 2,639,638 | 5/1953 | Gould | 81—380 |
| 3,498,101 | 3/1970 | Daniell | 81—8.1X |

ROBERT C. RIORDON, Primary Examiner

R. V. PARKER, Jr., Assistant Examiner

U.S. Cl. X.R.

7—3; 29—282; 81—5.1, 418